United States Patent
Levallard et al.

(10) Patent No.: US 6,938,888 B2
(45) Date of Patent: Sep. 6, 2005

(54) VIBRATION DAMPER, IN PARTICULAR FOR A HELICOPTER ROTOR

(75) Inventors: Patrice Levallard, Bry sur Marne (FR); Thierry Sieg, Encinitas (FR); Marc Runfola, Issy les Moulineaux (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/809,983

(22) Filed: Mar. 16, 2001

(65) Prior Publication Data

US 2001/0022418 A1 Sep. 20, 2001

(30) Foreign Application Priority Data

Mar. 20, 2000 (FR) .............................................. 00 03525

(51) Int. Cl.⁷ .................................................. F16F 13/00
(52) U.S. Cl. .............................. 267/140.11; 267/141.1; 267/294
(58) Field of Search ....................... 267/140.17, 140.13, 267/136, 141.1, 294, 34, 140.11

(56) References Cited

U.S. PATENT DOCUMENTS

| | | | | |
|---|---|---|---|---|
| 3,920,231 A | * | 11/1975 | Harrison et al. | 105/224.1 |
| 4,630,807 A | * | 12/1986 | Gaudiau | 267/140.13 |
| 4,913,409 A | * | 4/1990 | Doi et al. | 267/140.13 |
| 5,286,013 A | | 2/1994 | Seymour et al. | |
| 5,540,549 A | * | 7/1996 | McGuire | 267/140.13 |
| 5,641,153 A | * | 6/1997 | Gwinn | 267/140.13 |
| 5,816,566 A | * | 10/1998 | Gau et al. | 188/320 |
| 5,855,259 A | * | 1/1999 | Gau et al. | 188/298 |
| 5,979,618 A | * | 11/1999 | Sieg et al. | 188/322.19 |
| 6,045,328 A | * | 4/2000 | Jones | 248/562 |
| 6,250,441 B1 | * | 6/2001 | Shimoda | 188/322.5 |

FOREIGN PATENT DOCUMENTS

| | | |
|---|---|---|
| EP | 0 329 788 B1 | 8/1989 |
| FR | 2 754 579 A | 4/1998 |

* cited by examiner

*Primary Examiner*—Robert A. Siconolfi
*Assistant Examiner*—Bradley T King
(74) *Attorney, Agent, or Firm*—Alston & Bird LLP

(57) ABSTRACT

The invention relates to a vibration damper, in particular for a helicopter rotor, the damper comprising both a driving element and a rigid element and including a damper assembly functionally interconnecting the driving element and the rigid element, the damper assembly comprising firstly a hydraulic damper device disposed in at least one viscous fluid cavity and a laminated flexible device. The hydraulic damper device comprises first and second sets of interleaved plane vanes. In the invention, the hydraulic damper device also has at least one damper element which is disposed in one of said viscous fluid cavities and which is secured to the driving element, said damper element presenting an outer outline which tapers going away from a base situated beside one axial end of the damper towards an apex situated beside the sets of plane vanes.

5 Claims, 3 Drawing Sheets

VIBRATION DAMPER, IN PARTICULAR FOR A HELICOPTER ROTOR

The present invention relates to a vibration damper, in particular for a helicopter rotor, the damper comprising both a driving element having a "main" axis and designed to be driven by a driver element, and a rigid element designed to be mounted on a structure, and including a damper assembly functionally connecting the driving element and the rigid element to damp vibration in at least one direction perpendicular to said main axis.

BACKGROUND OF THE INVENTION

French patent application FR 2 754 579 filed in the name of the Applicant company on Oct. 15, 1996 and published on Apr. 17, 1998 describes a damper of that type in which the damper assembly comprises firstly a hydraulic damper device disposed in a viscous fluid cavity, and secondly a flexible device presenting high stiffness in a direction parallel to said main axis and low stiffness in the direction perpendicular to the main axis. That hydraulic damper device is constituted by first and second sets of plane vanes each having its plane extending perpendicularly to the main axis, the first set being secured to the driving element and the second set being secured to the rigid element, the vanes of the first and second sets being disposed in interleaved manner and being spaced close together so as to present viscous damping zones each situated between a vane of the first set and a vane of the second set.

The damper device having interleaved plane vanes as described in the above-specified application enables good performance and good linearity to be obtained for vibration at low or medium amplitude. However, as the amplitude of vibration increases, the relative speed between the vanes also tends to increase, thereby increasing shear and decreasing dynamic viscosity, and as a result the damping provided by the hydraulic device tends to diminish.

Viscous damper devices are also known that enable high damping to be obtained with large amplitudes of displacement since the damping provided is proportional to the square of speed, but they suffer from poor efficiency at low amplitudes.

OBJECTS AND SUMMARY OF THE INVENTION

The present invention proposes a vibration damper, in particular for a helicopter rotor, which presents damping that is satisfactory both for low amplitude vibration and for high amplitude vibration.

In a first aspect, the idea on which the invention is based is to design the damper in such a manner that at low amplitudes, damping is achieved essentially by sets of vanes as defined above, whereas at large amplitudes, it is a viscous damping type device which acts in addition or on its own to provide damping.

In the vibration damper of the invention, the hydraulic damper device also comprises at least one damper element which is disposed in one of said viscous fluid cavities and which is secured to the driving element, said damper element presenting an outer outline that tapers going from a base situated beside one axial end of the damper to an apex situated adjacent to said sets of plane vanes.

At low amplitude, the damping element is relatively far away from the wall of the cavity(ies) and damping is provided for the most part by the sets of vanes. In contrast, at large amplitude, the flexible device tends to deform and as amplitude increases, the outer outline of the damping element comes at least locally close to the wall of the cavity, thereby increasing the viscous damping effect in the direction in which deformation takes place, firstly because the section of the through passage diminishes, and secondly because of the non-linearity of this effect which, as mentioned above, is proportional to the square of speed.

In particular, the damper element lies within a maximum deformation outline of the inside surface of the flexible device. Preferably, the outer outline of the damper element is inscribed at a predetermined distance from said maximum deformation outline of the flexible device.

Advantageously, the outer outline of the damper element presents a section formed by straight line segments sloping relative to said main axis.

Preferably, the apex of the damper device is elliptical and its base is circular, or in the form of a circle that is interrupted by straight line segments.

It is particularly advantageous for the damper element to be hollow and to have a volume-compensating cavity which communicates with at least one of said viscous fluid cavities and in which there is disposed a volume-compensating element, in particular a resilient diaphragm.

Preferably, when the damper is raised to its minimum operating temperature, the resilient diaphragm does not have any folds and it remains at a distance from an inner wall of the damper element.

The outer outline of at least one viscous fluid cavity can be elongate in a first direction. At least the base of the damper element can be elongate in a second direction perpendicular to the first direction. This makes it possible to obtain damping characteristics that are different in the first and second directions, with displacement being greater in the first direction.

In a second aspect, the invention provides a vibration damper, in particular for a helicopter rotor, the damper comprising both a driving element having a "main" axis and designed to be driven by a driver element, and a rigid element designed to be mounted on a structure, and including a damper assembly functionally connecting the driving element and the rigid element to damp vibration in at least one direction perpendicular to said main axis, the damper assembly having firstly a hydraulic damper device placed in at least one viscous fluid cavity and secondly a flexible device presenting high stiffness in a direction parallel to said main axis, and low stiffness in said direction perpendicular to the main axis.

A device of that type is described in the above-cited French application and it presents a volume-compensating device. Volume-compensating devices have been in use for many years in hydraulic systems, in particular in the form of hydraulic accumulators, e.g. OLAER or LEDUC and they have also been used for many years in the above-mentioned vibration dampers. In the above-cited French application, the volume-compensating device has an undulating diaphragm with one face in contact with the fluid in the cavity and its other face in contact with a cavity containing a gas. That device suffers from the drawback of the diaphragm being somewhat vulnerable.

In a second aspect, the invention proposes to remedy that problem, and to this end the vibration damper presents at least one volume-compensating cavity which communicates with at least one of said viscous fluid cavities, and within which there is placed a resilient diaphragm whose inner wall defines a variable-volume cavity filled with a gas, and whose outer wall cooperates with an inner wall of said volume-compensating cavity to define a compensation fluid cavity, the resilient diaphragm being placed at a determined non-zero distance from said inner wall without forming any folds when the vibration damper is at its specified minimum operating temperature.

As a result, the compensation volume is guaranteed to be effective under all conditions in which the damper is likely to find itself, and furthermore the inner wall of the compensation cavity makes it possible to protect the resilient diaphragm.

Advantageously, the compensation volume is formed inside a flared hollow part extending between the hydraulic damper device and an axial end of the damper.

BRIEF DESCRIPTION OF THE DRAWINGS

Other characteristics and advantages of the invention will appear better on reading the following description given by way of non-limiting example and with reference to the accompanying drawings, in which.

MORE DETAILED DESCRIPTION

Figure 1A:
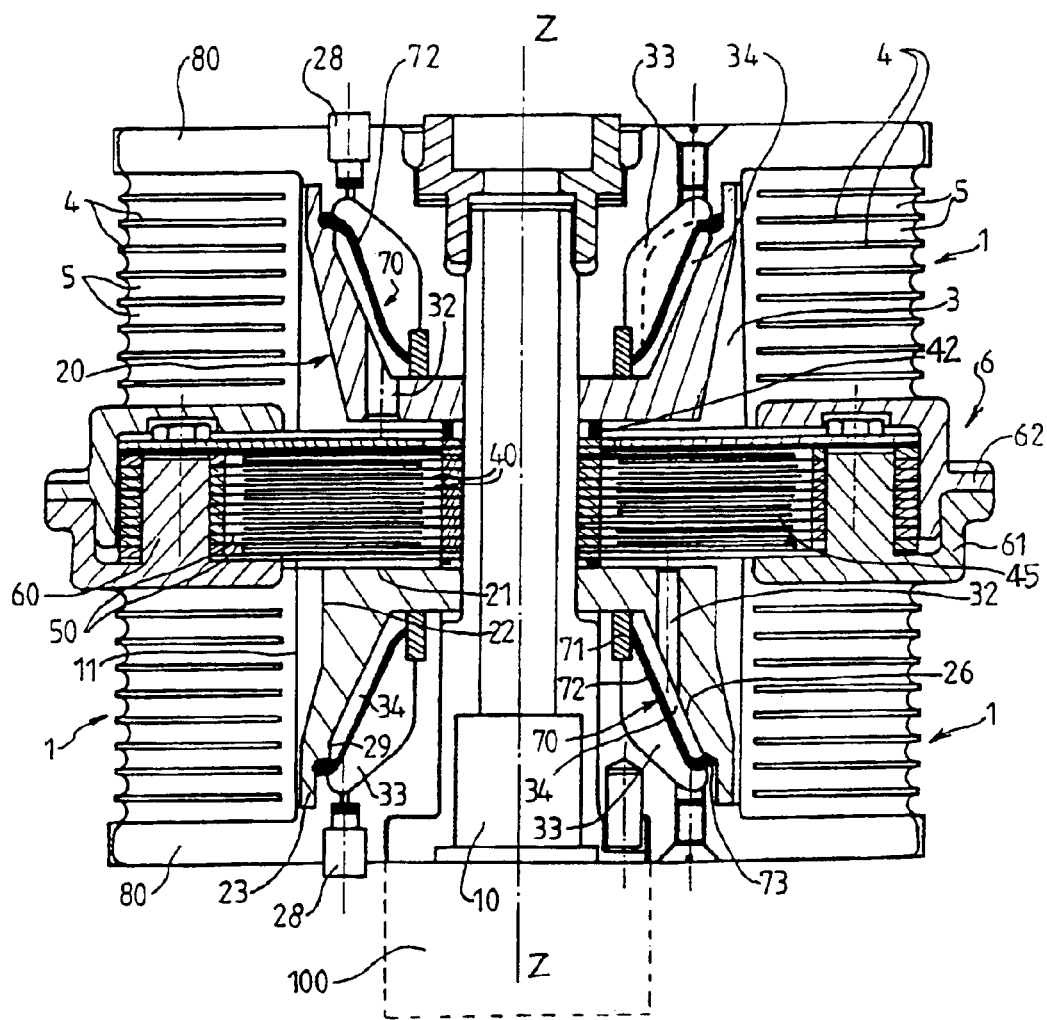
FIGS. 1a and 1b are two longitudinal sections on perpendicular planes through a damper constituting a preferred embodiment of the invention.
Figure 1B:
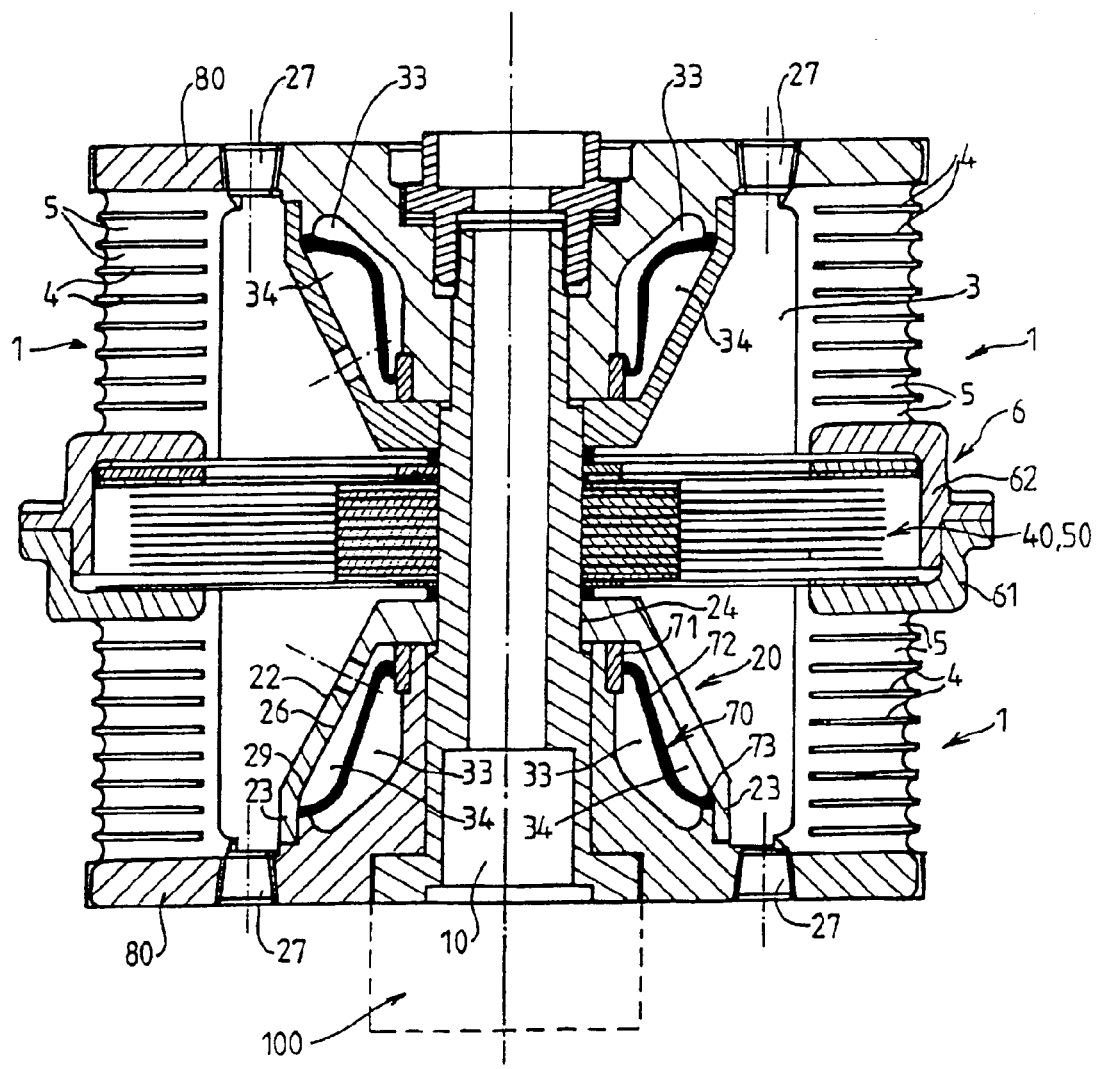

As shown in FIGS. 1a and 1b, the vibration damper has a driving element 10 whose axis ZZ is the main axis of the damper and which is designed to be driven by a driver element 100. A first set of vanes 40 is secured (ignoring decoupling) to the driving element 10, and a second set of vanes 50, interleaved between the first set, is secured (ignoring decoupling) to a rigid element 6. In the example shown, compression excitation decoupling is obtained by the vanes overlapping partially, but this function could be provided by any other means described in above-cited application FR 2 754 579.

In the example shown, the structure is symmetrical about a midplane perpendicular to the main axis of the driving element 10. The set of vanes 40 and 50 is disposed in a middle position and is centered relative to a flexible device 1 which includes a laminated structure constituted by a stack of metal washers 4 and of elastomer washers 5 on planes perpendicular to the axis of the cylinder 10. The laminated structure 1 presents an inner outline 11 which defines the outer outlines of two cavities 3 situated on either side of the set of vanes 40 and 50, which cavities are filled with a viscous fluid in which the vanes and the space situated between them are likewise immersed so as to obtain the desired damping.

At its top and bottom ends, i.e. at its axial ends, the device is closed by covers 80 which are secured to damper elements 20 having respective apexes 21 situated close to the set of vanes 40 and 50 and respective bases 23 the apexes 21 and the bases 23 being interconnected by respective outer outlines 22 which flare progressively from each apex 21 towards its base 23.

Advantageously, the damper element 20 is hollow and defines a damping cavity that is split into two cavities, an air cavity 33 and a fluid cavity 34, by a diaphragm 70 which is received at its apex 71 in the vicinity of an inside face 25 of the element 20 and which is clamped at its base 73 between the base 23 of the damper element 20 and the cover 80. The diaphragm 70 has an active region 72 which houses a flared inner wall 26 which defines the outside of the cavity 34. The fluid cavity 34 communicates with the cavity 3 via one or more openings 31 so as to produce the desired volume-compensating effect.

It should also be observed that the openings 27 enable the cavities 3 to be filled, and the openings 28 enable the cavities 33 to be filled with gas corresponding to the insides of the resilient diaphragms 70, e.g. made of elastomer. This filling can require the gas to be pressurized. The compensation system can be any resilient system, e.g. a system associating a piston with a spring.

It would also be observed that the assembly plates 60 situated on either side of the set of vanes 40 and 50 has openings 63 (FIG. 1b) to pass the viscous fluid filling the cavities 3. Spacers 42 serve to ensure that the stack comprising the cover 80, the damper elements 20, and the sets 40 and 50 of vanes are stacked along the axis 10 whereas over the outer portion complementary flanges 61 and 62 serve for assembly purposes in the laminated flexible device 1 where stacking is also ensured by means of the cover 80.

The damper element 20 is preferably made in the form of a cup having an apex 21 with a circular central opening 24 and a substantially elliptical outer outline 21, and a base 23 presenting circular portions $23_1$ interconnected by straight line segments $23_2$. The outer outline 22 in section presents straight line segments which interconnect the elliptical outline of the apex 21 and the outline of the base 23.

The flared outer outline 22 enables the element 20 to be inscribed within the outline of the maximum deformations of the laminated device 1 under the most severe of operating conditions, with this taking place leaving clearance that is selected as a function of the desired damping. As a result, it is certain firstly that the outer outline 22 of the damper element 20 will never come into contact with the inner outline 11 of the laminated structures 1, even under the most severe of operating conditions, and secondly that the damper element 20 will provide a large damping effect for vibration of large amplitude.

Figure 2A:
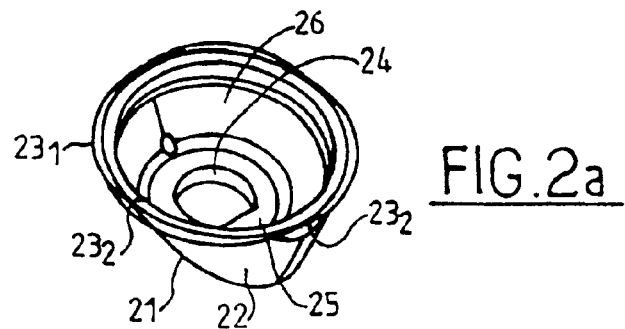
FIGS. 2a to 2c are respectively a perspective view, a section view, and a plan view of a damper element in a preferred embodiment of the invention.
Figure 2B:
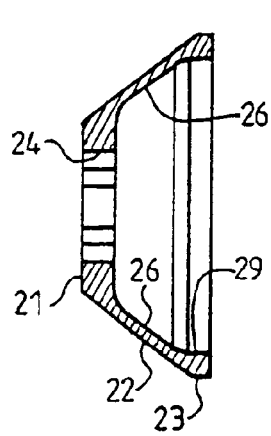
Figure 2C:
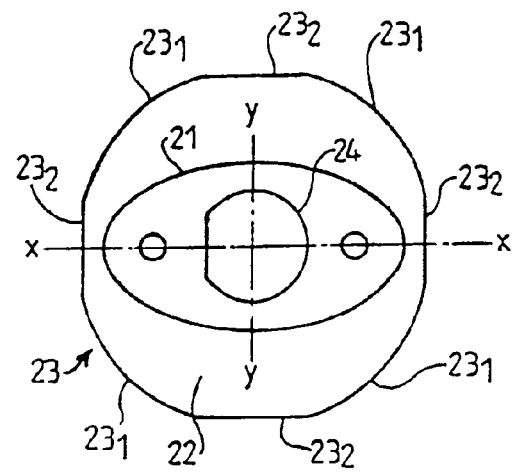
Figure 3:
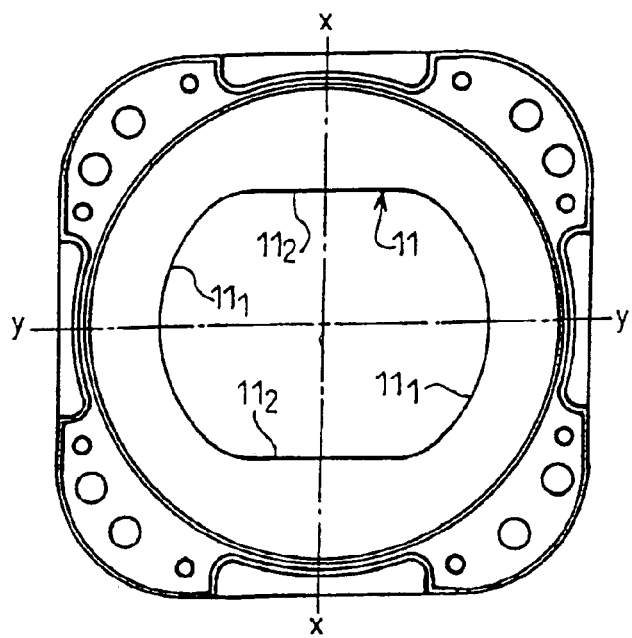
FIG. 3 shows the outer outline of the fluid cavity(ies).

As shown in FIG. 3, the outline 11 which defines the outsides of the cavities 3 is elongate in shape being defined at its ends by two circular arcs $11_1$ which are interconnected by straight line segments $11_2$. In FIG. 2c, reference XX designates the major axis of the ellipse 21 and YY the minor axis thereof, with these directions being shown in FIG. 3 to indicate the relative position of the part 20 relative to the element 1. The section of FIG. 1a is on the plane containing the axis XX and the axis ZZ, whereas the section of FIG. 1b is on the plane containing the axis YY and the axis ZZ. The largest displacements that the damper element can perform take place in the YY direction.

As shown more particularly in FIGS. 1a and 1b, at the minimum operating temperature, the active portion 72 of the resilient diaphragm 70 follows the inner wall 26 of the element 20 at a given residual distance and it does so without forming any folds, thus making it possible to maintain effective volume compensation in all operating conditions. At ambient temperature (20° C.), the diaphragm 70 occupies the position shown in dashed lines in FIG. 1a. As the temperature goes down, the viscous fluid contracts, with this contraction decreasing the volume of the cavities 34. Because the diaphragm 70 does not have any folds, it contracts uniformly and comes to run parallel to the wall 26 without forming any folds. The absence of folds at the minimum operating temperature makes it possible to prevent the diaphragm 70 from coming locally into contact with the inner wall 26, which would otherwise decrease the efficiency of volume compensation by isolating a portion of the fluid cavity 34.

What is claimed is:

1. A vibration damper for a helicopter rotor, the damper comprising both a driving element having a main axis and designed to be driven by a driver element, and a rigid element designed to be mounted on a structure, and including a damper assembly functionally connecting the driving element and the rigid element to damp vibration in at least one direction perpendicular to said main axis, the damper assembly having firstly at least one viscous fluid cavity and a hydraulic damper device placed in said at least one viscous fluid cavity and secondly a flexible device presenting high stiffness in a direction parallel to said main axis, and low stiffness in said direction perpendicular to the main axis, the hydraulic damper device presenting first and second sets of plane vanes, each having its plane perpendicular to the main axis, the first set being mounted on the driving element via a first mechanical link and the second set being mounted on the rigid element via a second mechanical link, the vanes of the first and second sets being disposed in interleaved manner and being closely spaced apart so as to present viscous damping zones each situated between a vane of the first set and a vane of the second set, wherein the hydraulic damper device also comprises at least one damper element which is disposed in one of said at least one viscous fluid cavities and which is secured to the driving element, said damper element presenting an outer outline that tapers going from a base situated beside one axial end of the damper to an apex situated adjacent to the sets of plane vanes to provide a viscous dampening effect that increases as amplitude increases, wherein the at least one viscous fluid cavity has an outer outline that is elongate in a first direction perpendicular to the main axis, and wherein at least the base of the damper element is elongate in a second direction perpendicular to the first direction.

2. A vibration damper for a helicopter rotor, the damper comprising both a driving element having a main axis and designed to be driven by a driver element, and a rigid element designed to be mounted on a structure, and including a damper assembly functionally connecting the driving element and the rigid element to damp vibration in at least one direction perpendicular to said main axis, the damper assembly having firstly at least one viscous fluid cavity and a hydraulic damper device placed in said at least one viscous fluid cavity and secondly a flexible device presenting high stiffness in a direction parallel to said main axis, and low stiffness in said direction perpendicular to the main axis, the hydraulic damper device presenting first and second sets of plane vanes, each having its plane perpendicular to the main axis, the first set being mounted on the driving element via a first mechanical link and the second set being mounted on the rigid element via a second mechanical link, the vanes of the first and second sets being disposed in interleaved manner and being closely spaced apart so as to present viscous damping zones each situated between a vane of the first set and a vane of the second set, wherein the hydraulic damper device also comprises at least one damper element which is disposed in one of said at least one viscous fluid cavities and which is secured to the driving element, said damper element presenting an outer outline that presents a section formed by straight line segments inclined relative to said main axis and that tapers going from a base situated beside one axial end of the damper to an apex situated adjacent to the sets of plane vanes to provide a viscous dampening effect that increases as amplitude increases, wherein the apex of the damper element is elliptical, and wherein its base is a circle or a circle interrupted by straight line segments.

3. A vibration damper, for a helicopter rotor, the damper comprising both a driving element having a main axis and designed to be driven by a driver element, and a rigid element designed to be mounted on a structure, and including a damper assembly functionally connecting the driving element and the rigid element to damp vibration in at least one direction perpendicular to said main axis, the damper assembly having firstly at least one viscous fluid cavity and a hydraulic damper device placed in said at least one viscous fluid cavity and secondly a flexible device presenting high stiffness in a direction parallel to said main axis, and low stiffness in said direction perpendicular to the main axis, the hydraulic damper device presenting first and second sets of plane vanes, each having its plane perpendicular to the main axis, the first set being mounted on the driving element via a first mechanical link and the second set being mounted on the rigid element via a second mechanical link, the vanes of the first and second sets being disposed in interleaved manner and being closely spaced apart so as to present viscous damping zones each situated between a vane of the first set and a vane of the second set, wherein the hydraulic damper device also comprises at least one damper element which is disposed in one of said at least one viscous fluid cavities and which is secured to the driving element, said damper element presenting an outer outline that tapers going from a base situated beside one axial end of the damper to an apex situated close to the sets of plane vanes to provide a viscous dampening effect that increases as amplitude increases, wherein the damper element is elongate in a direction perpendicular to said main axis and wherein, in a section defined by a plane comprising said main axis and parallel to said direction, a cross-section between the outer outline of the damper element and an outer outline of said viscous fluid cavity is minimal, and wherein the damper element is hollow and has an inside volume-compensating cavity which communicates with said at least one viscous fluid cavity and wherein a resilient diaphragm is disposed in said volume-compensating cavity, said diaphragm separating said volume-compensating cavity in two parts, a first part filled with said viscous fluid and communicating with said at least one viscous fluid cavity, and a second part that is filled with a gas to effect said volume compensation.

4. A vibration damper according to claim 3, wherein, when it is at a minimum operating temperature, the resilient diaphragm does not present any folds and remains at a distance from an inner wall of the damper element.

5. A vibration damper for a helicopter rotor, the damper comprising both a driving element having a main axis and designed to be driven by a driver element, and a rigid element designed to be mounted on a structure, and including a damper assembly functionally connecting the driving element and the rigid element to damp vibration in at least one direction perpendicular to said main axis, the damper assembly having firstly at least one viscous fluid cavity and a hydraulic damper device placed in said at least one viscous fluid cavity and secondly a flexible device presenting high stiffness in a direction parallel to said main axis, and low stiffness in said direction perpendicular to the main axis, the hydraulic damper device presenting first and second sets of plane vanes, each having its plane perpendicular to the main axis, the first set being mounted on the driving element via a first mechanical link and the second set being mounted on the rigid element via a second mechanical link, the vanes of the first and second sets being disposed in interleaved manner and being closely spaced apart so as to present viscous damping zones each situated between a vane of the first set and a vane of the second set, wherein the hydraulic damper device also comprises at least one damper element which is disposed in one of said at least one viscous fluid cavities and which is secured to the driving element, said damper element presenting an outer outline that tapers going from a base situated beside one axial end of the damper element to an apex situated at a distance from the sets of plane vanes that is small relative to the distance between said apex and said axial end of the damper element, a distance between an outer outline of said base and an outer outline of the cavity being small relative to the distance between said outer outline of said base and said main axis whereby a viscous dampening effect that increases as amplitude increases is produced.

* * * * *